(12) United States Patent
Jin

(10) Patent No.: US 8,072,742 B2
(45) Date of Patent: Dec. 6, 2011

(54) CHASSIS AND MANUFACTURING METHOD THEREOF

(75) Inventor: Dian-Fa Jin, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 219 days.

(21) Appl. No.: 12/489,453

(22) Filed: Jun. 23, 2009

(65) Prior Publication Data

US 2010/0277044 A1 Nov. 4, 2010

(30) Foreign Application Priority Data

Apr. 30, 2009 (CN) .......................... 2009 1 0302000

(51) Int. Cl.
*H05K 7/14* (2006.01)

(52) U.S. Cl. ......... 361/679.02; 361/679.26; 361/679.55; 400/472; 312/223.1; 312/223.2

(58) Field of Classification Search ............. 361/679.26, 361/720
See application file for complete search history.

(56) References Cited

U.S. PATENT DOCUMENTS

| | | | |
|---|---|---|---|
| 4,602,826 A * | 7/1986 | Zimmer | 312/7.2 |
| 4,675,782 A * | 6/1987 | Hibbert et al. | 361/658 |
| 5,111,361 A * | 5/1992 | Kobayashi | 361/679.44 |
| 5,243,549 A * | 9/1993 | Oshiba | 361/679.09 |
| 5,258,888 A * | 11/1993 | Korinsky | 361/704 |
| 5,541,809 A * | 7/1996 | Kakizaki et al. | 361/679.33 |
| 6,693,371 B2 * | 2/2004 | Ziegler et al. | 307/64 |
| 7,271,997 B2 * | 9/2007 | Kee et al. | 361/679.27 |
| 7,666,005 B2 * | 2/2010 | Heggemann et al. | 439/76.1 |
| 7,724,510 B2 * | 5/2010 | Goto et al. | 361/679.27 |
| 7,778,016 B2 * | 8/2010 | Minaguchi et al. | 361/679.17 |
| 2007/0019372 A1* | 1/2007 | Wong et al. | 361/683 |
| 2007/0291446 A1* | 12/2007 | Abram | 361/683 |
| 2009/0009939 A1* | 1/2009 | Nakajima et al. | 361/680 |
| 2009/0179537 A1* | 7/2009 | Morino et al. | 312/223.2 |
| 2009/0323266 A1* | 12/2009 | Mizuno | 361/679.02 |

* cited by examiner

*Primary Examiner* — Jinhee Lee
*Assistant Examiner* — Anthony Q Edwards
(74) *Attorney, Agent, or Firm* — Altis Law Group, Inc.

(57) ABSTRACT

A chassis includes a base board defining a receiving space, a clapboard detachably received in the receiving space, and two fasteners. The receiving space includes a sidewall, and a plurality of fixing posts extend from the sidewall. Two fixing columns each defining a fixing hole extend from opposite ends of the base board, neighboring the sidewall. The clapboard includes a main body defining a plurality of engaging holes to engage with the plurality of fixing posts of the base board, and two fixing portions each defining a through hole extending from opposite ends of the main body. The two fasteners are passed through the through holes of the fixing portions and engaged in the fixing holes of the fixing columns, respectively.

3 Claims, 8 Drawing Sheets

CHASSIS AND MANUFACTURING METHOD THEREOF

BACKGROUND

1. Technical Field

The disclosure relates to chassis and manufacturing methods thereof, and particularly to a chassis of an electronic device and a method for manufacturing the chassis.

2. Description of Related Art

A chassis of an electronic device, such as a notebook computer, normally includes a base board and a clapboard extending from the base board to bound a receiving space, for receiving batteries of the electronic device. In manufacturing, the base board and the clapboard are integrally molded. However, the base board and the clapboard are difficult to be simultaneously molded in a molding machine.

DETAILED DESCRIPTION

Figure 1:
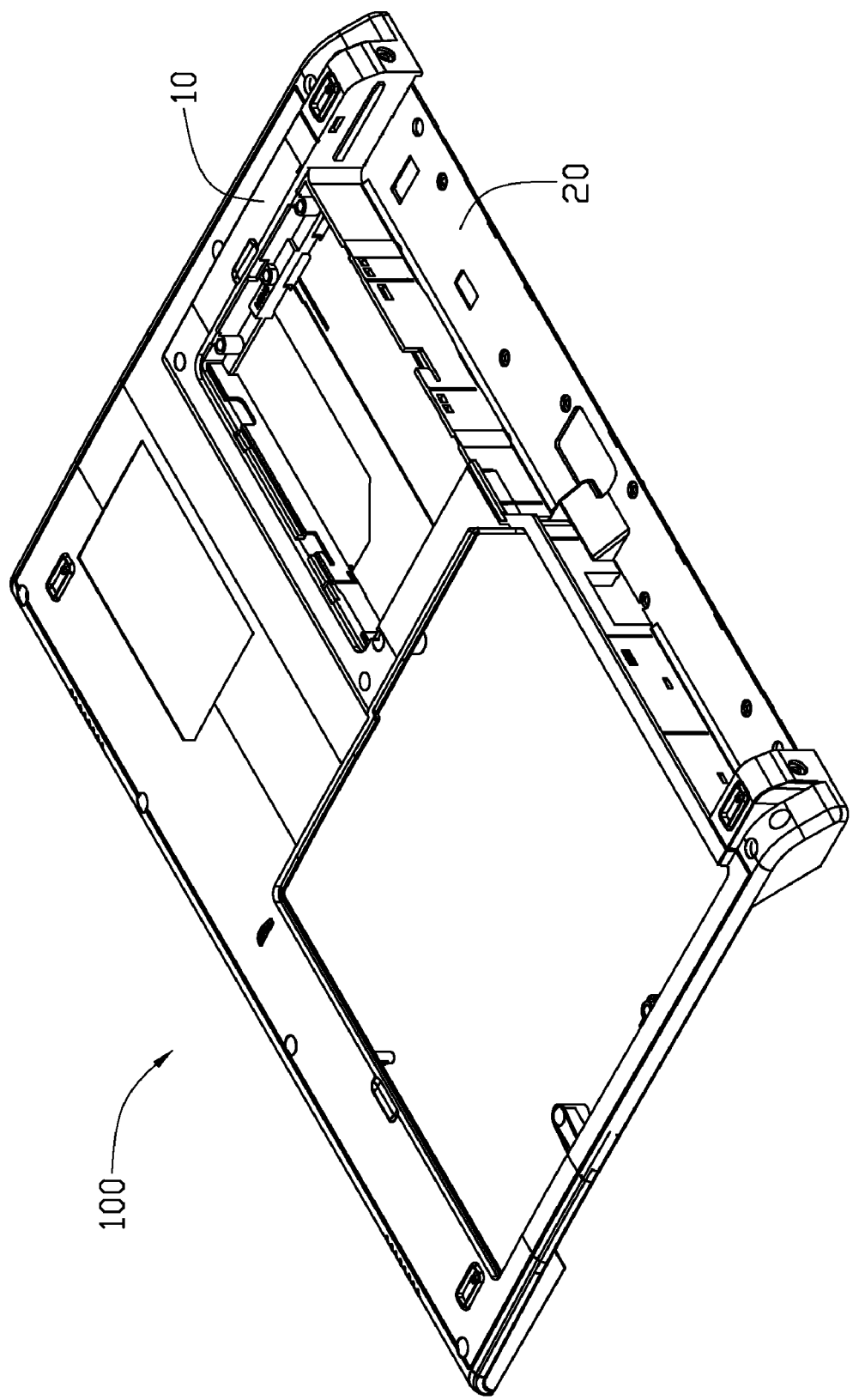
FIG. 1 is an assembled, isometric view of an exemplary embodiment of a chassis of an electronic device, the chassis including a base board and a clapboard fixed to the base board.
Figure 2:
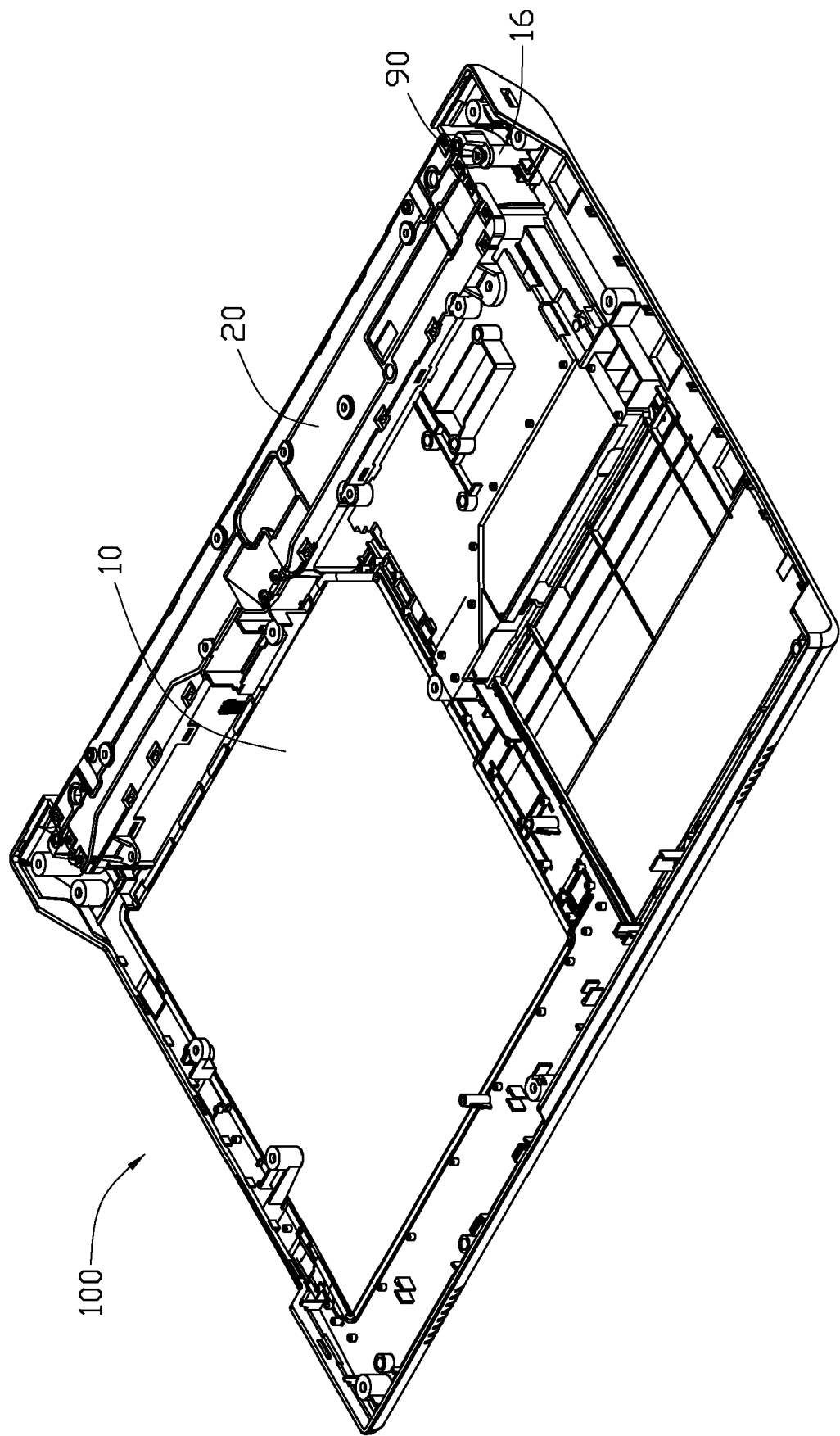
FIG. 2 is an inverted view of the chassis of FIG. 1.

Referring to FIGS. 1 and 2, an exemplary embodiment of a chassis 100 of an electronic device, such as a notebook computer, includes a base board 10, a clapboard 20 fixed to the base board 10, and two fasteners 90. In the embodiment, the fasteners 90 are screws, but the disclosure is not limited thereto.

Figure 3:
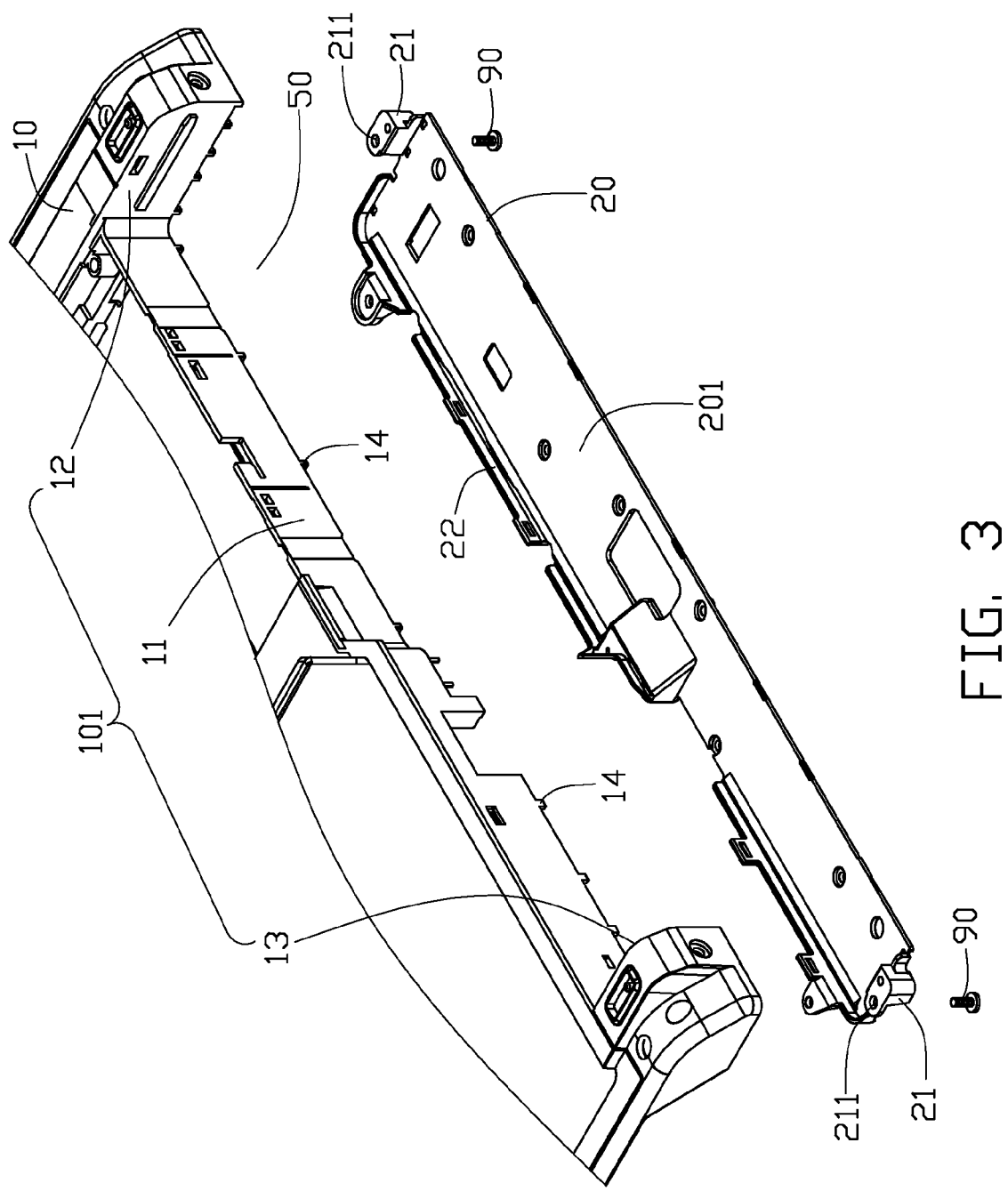
FIG. 3 is an exploded, isometric view of the chassis of FIG. 1, with the base board being partially cut off.
Figure 4:
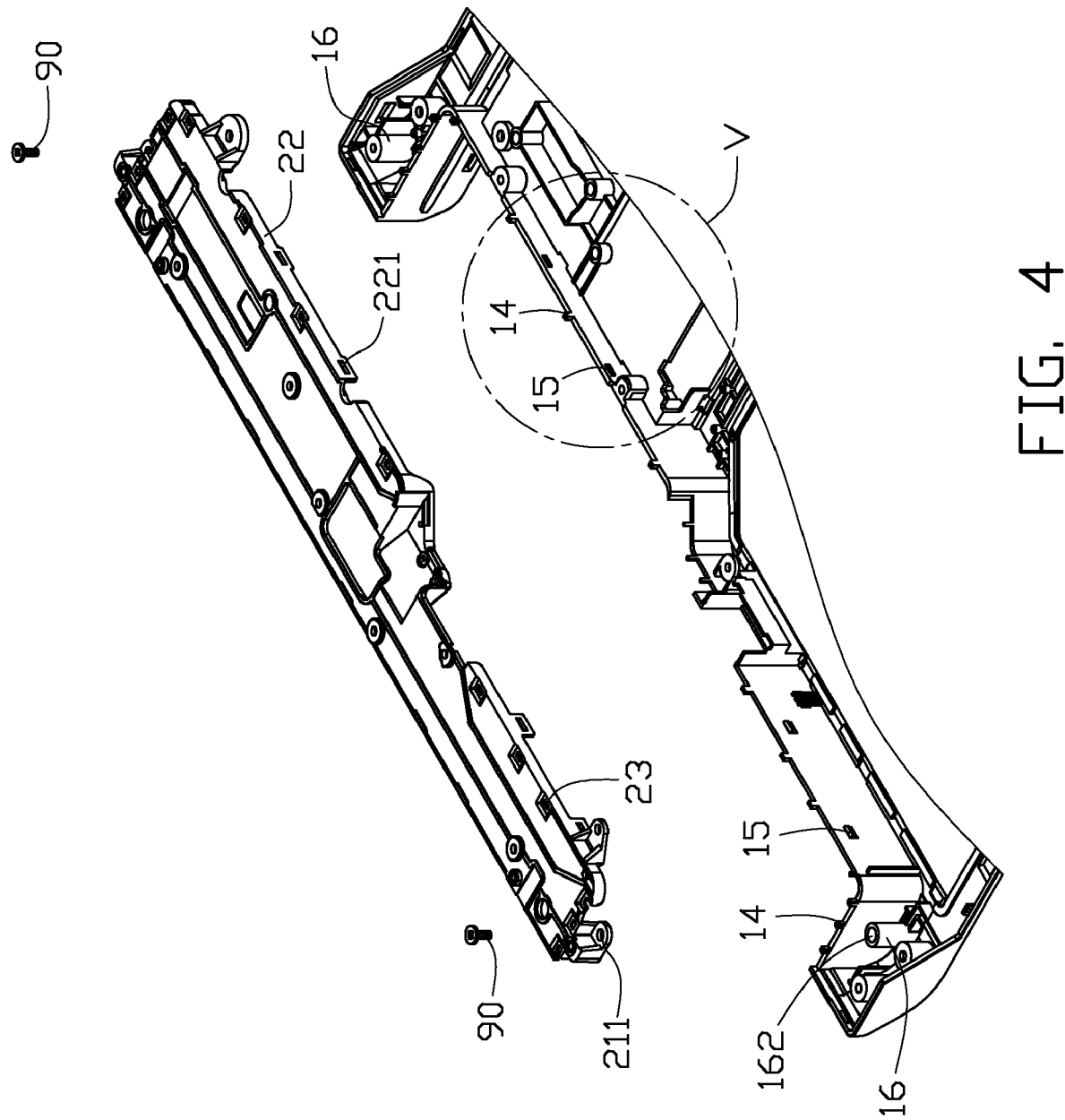
FIG. 4 is an inverted view of the chassis of FIG. 3.
Figure 5:
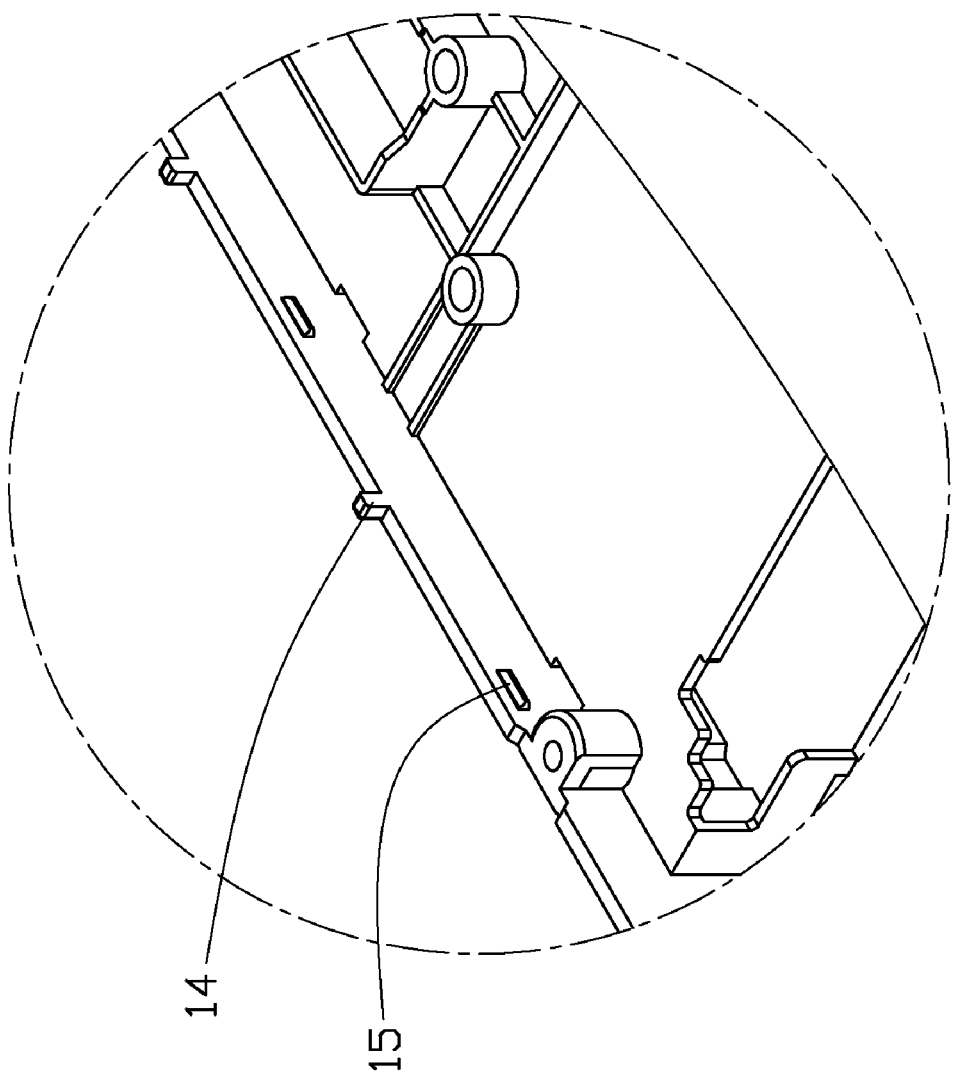
FIG. 5 is an enlarged view of an encircled portion V of FIG. 4.

Referring to FIGS. 3 to 5, the base board 10 defines a receiving space 50 in a rear portion of the base board 10, for receiving electronic components, such as batteries therein, for example (not shown). The receiving space 50 includes a U-shaped sidewall 101, and a plurality of fixing posts 14 extending down from a bottom of the sidewall 101. The sidewall 101 includes a first portion 11, and a second portion 12 and a third portion 13 parallel to each other and perpendicularly extending from opposite ends of the first portion 11. The first portion 11 includes a first surface facing the receiving space 50, and a second surface opposite to the first surface. A plurality of clamping tabs 15 perpendicularly extend from the second surface of the first portion 11. Two fixing columns 16, each axially defining a fixing hole 162, perpendicularly extend down from the second and third portions 12, 13 of the base board 10, respectively.

The clapboard 20 includes a main body 201 and two fixing portions 21 extending upwards from opposite ends of the main body 201. Each fixing portion 21 defines a through hole 211 corresponding to the fixing hole 162 of a corresponding fixing column 16 of the base board 10. A flange 22 perpendicularly extends up from a side of the main body 201. The flange 22 defines a plurality of clamping slots 221, for fixedly receiving the plurality of clamping tabs 15 of the base board 10. The main body 201 defines a plurality of engaging holes 23 neighboring the flange 22, to engage with the plurality of fixing posts 14 of the base board 10. Cutouts are defined in the flange 22, aligned with the engaging holes 23 respectively.

Figure 6:
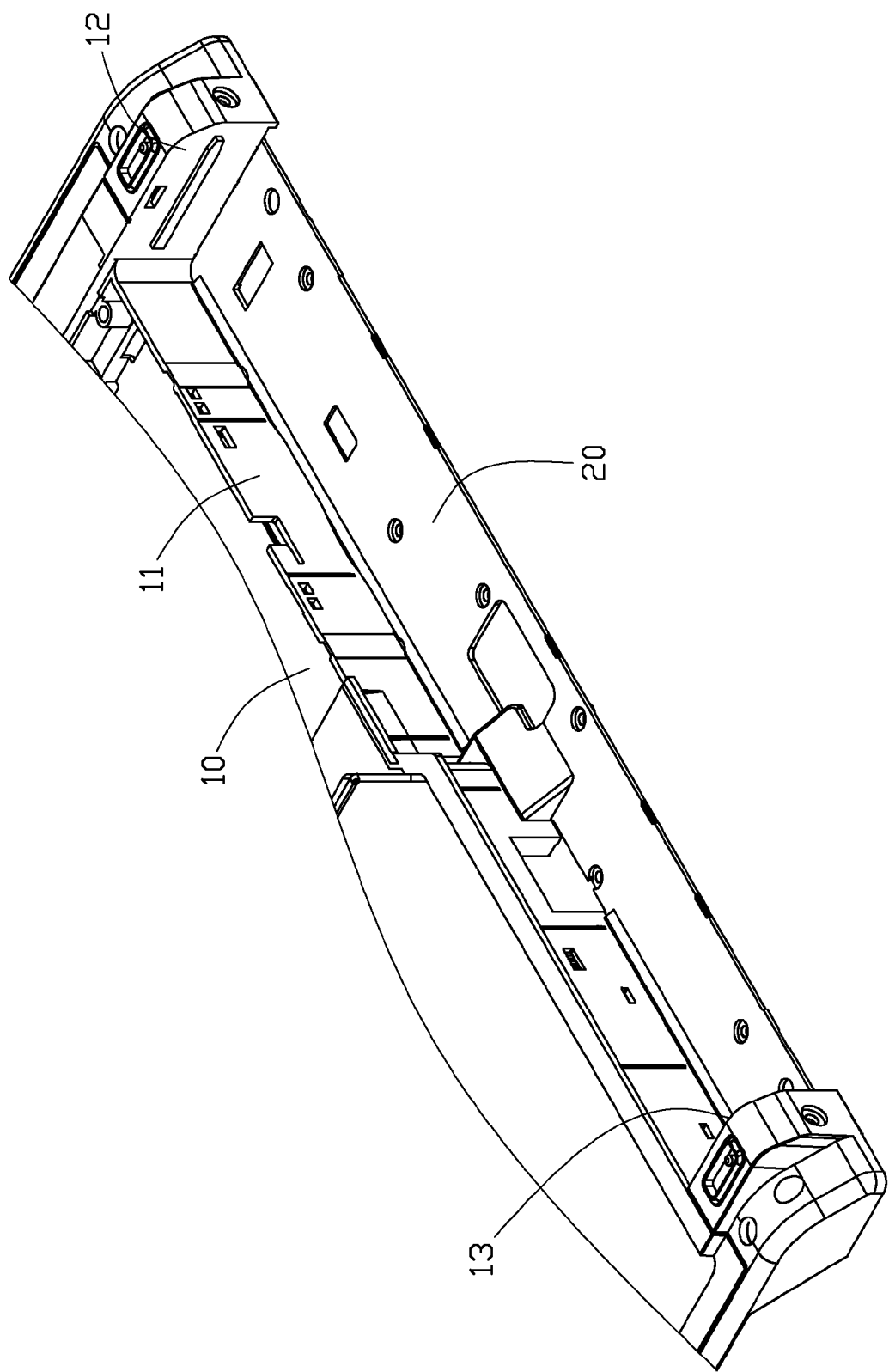
FIG. 6 is an assembled, isometric view of the chassis of FIG. 3.
Figure 7:
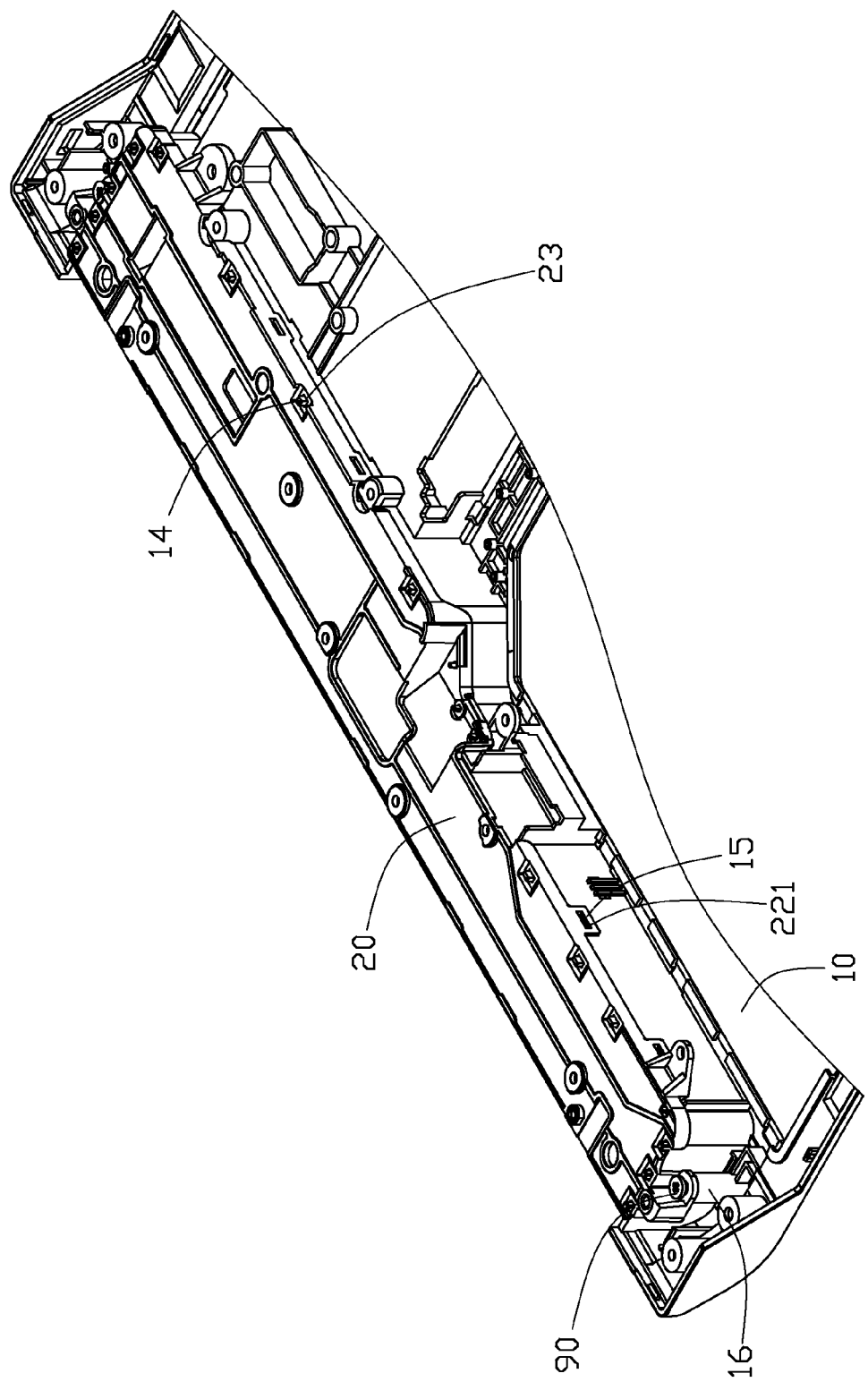
FIG. 7 is an inverted view of the chassis of FIG. 6.
Figure 8:
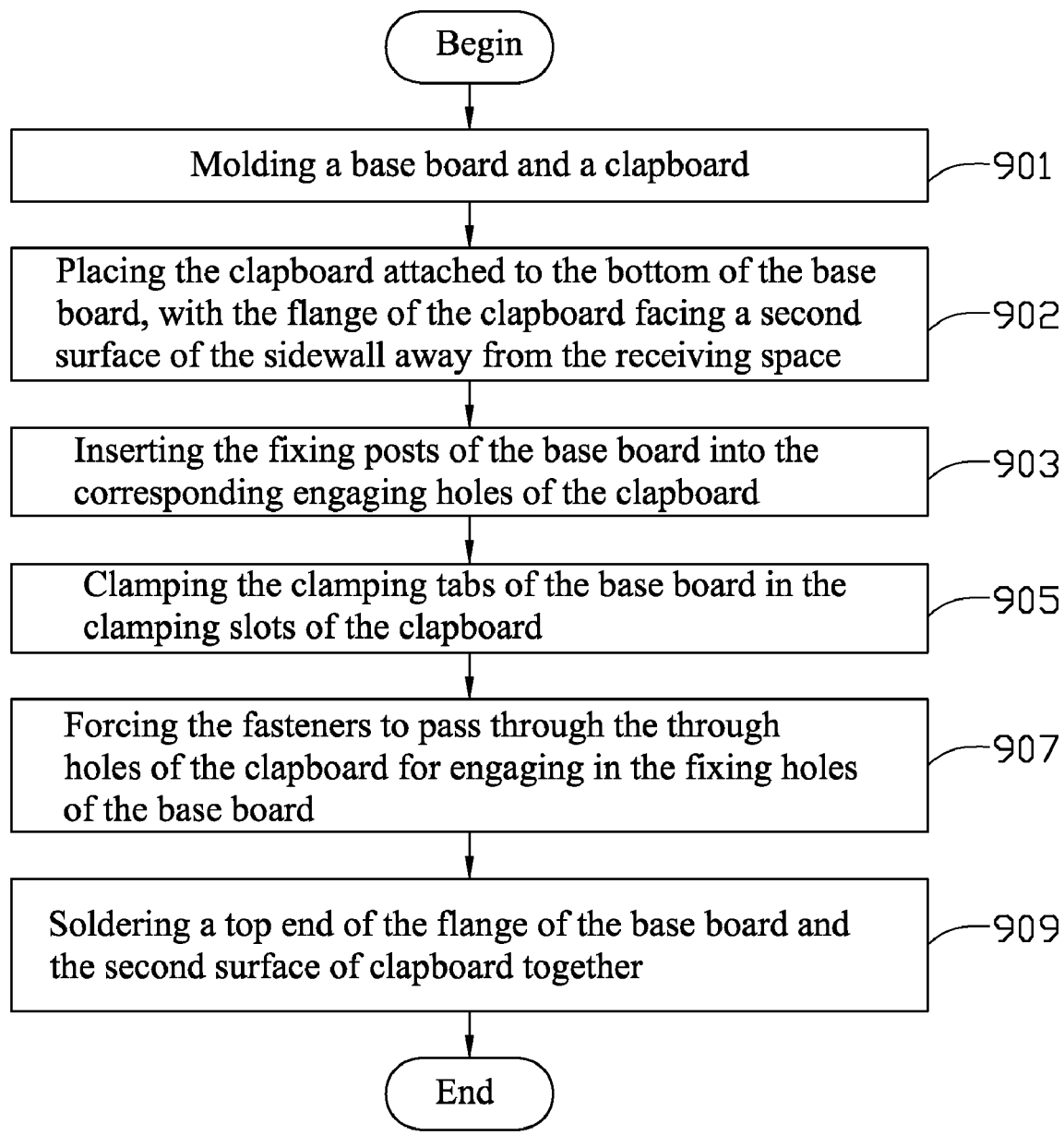
FIG. 8 is a flowchart of an exemplary embodiment of a manufacturing method of the chassis of FIG. 1.

Referring to FIGS. 6 and 7, in assembly, the clapboard 20 is attached to the bottom of the base board 10, with the flange 22 of the clapboard 20 facing the second surface of the first portion 11 of the base board 10. The fixing posts 14 of the base board 10 are inserted into the corresponding engaging holes 23 of the clapboard 20, and the clamping tabs 15 of the base board 10 are engaged in the corresponding clamping slots 221 of the clapboard 20. The fasteners 90 are passed through the corresponding through holes 211 of the clapboard 20 to be engaged in the corresponding fixing holes 162 of the base board 10. Therefore, the clapboard 20 is fixed to the base board 10, with a little gap formed between the flange 22 of the clapboard 20 and the second surface of the first portion 11 of the sidewall 101 of the base board 10. Then, the flange 22 and the second surface of the first portion 11 of the sidewall 101 are soldered by a fuse machine, laser microwelder, or the like, to close the gap. Therefore, the base board 10 and the clapboard 20 are tightly soldered together.

Referring to FIG. 7, a manufacturing method for the chassis of the electronic device includes the following steps.

In step 901, the base board 10 and the clapboard 20 are separately molded.

In step 902, the clapboard 20 is attached to the bottom of the base board 10, with the flange 22 of the clapboard 20 facing the second surface of the first portion 11 of the base board 10.

In step 903, the plurality of fixing posts 14 of the base board 10 are inserted into the corresponding engaging holes 23 of the clapboard 20.

In step 905, the plurality of clamping tabs 15 of the base board 10 are engaged in the corresponding clamping slots 221 of the clapboard 20.

In step 907, the fasteners 90 are extended through the corresponding through holes 211 of the clapboard 20 to be engaged in the corresponding fixing holes 162 of the base board 10 to fix the clapboard 20 to the base board 10, with a little gap formed between the flange 22 of the clapboard 20 and the second surface of the first portion 11 of the sidewall 101 of the base board 10.

In step 909, the flange 22 and the second surface of the first portion 11 of the sidewall 101 are tightly soldered together.

It is believed that the present embodiment and its advantages will be understood from the foregoing description, and it will be apparent that various changes may be made thereto without departing from the spirit and scope of the description or sacrificing all of its material advantages, the example hereinbefore described merely being exemplary embodiment.

What is claimed is:

1. A chassis, comprising:
   a base board defining a receiving space, wherein the receiving space comprises a sidewall, a plurality of fixing posts extend from the sidewall, two fixing columns each defining a fixing hole extend from opposite ends of the base board neighboring the sidewall;
   a clapboard detachably received in the receiving space, the clapboard comprising a main body defining a plurality of engaging holes to engage with the plurality of fixing posts of the base board, and two fixing portions each defining a through hole extending from opposite ends of the main body; and two fasteners, wherein the two fasteners are respectively passed through the through holes of the fixing portions and engaged in the fixing holes of the fixing columns;

wherein the sidewall comprises a first portion, a second portion, and a third portion parallel to the second portion, and the second and third portions extend from opposite ends of the first portion, respectively; and wherein a flange perpendicularly extends from a side of the main body, the flange defines a plurality of clamping slots, and a plurality of clamping tabs extend from the first portion to engage in the plurality of clamping slots.

2. The chassis of claim 1, wherein the fixing portions are located neighboring opposite ends of the flange, respectively.

3. The chassis of claim 1, wherein the fixing columns respectively extend from the second and third portions, and the fixing columns and the plurality of fixing posts are located at the same side of the base board.

* * * * *